United States Patent [19]

Dietiker et al.

[11] Patent Number: 4,637,429
[45] Date of Patent: Jan. 20, 1987

[54] FLUID PRESSURE REGULATING VALVE HAVING ADJUSTABLE TWO-STAGE AND NATURAL-LP GAS CHANGEOVER CAPABILITIES

[75] Inventors: Paul Dietiker, Redondo Beach, Calif.; Marvin D. Nelson, St. Louis Park, Minn.

[73] Assignee: Honeywell Inc., Minneapolis, Minn.

[21] Appl. No.: 786,443

[22] Filed: Oct. 11, 1985

[51] Int. Cl.$^4$ ............... G05D 16/06; G05D 16/20
[52] U.S. Cl. ............... 137/505.14; 137/495; 251/129.02; 251/129.18
[58] Field of Search ............... 137/495, 505.14; 251/129.02, 129.18, 285

[56] References Cited

U.S. PATENT DOCUMENTS

| | | | |
|---|---|---|---|
| 2,147,945 | 2/1939 | Hann et al. | 251/129.18 X |
| 3,006,362 | 10/1961 | Spence | 137/505.14 X |
| 3,342,451 | 9/1967 | Matousek | 251/285 X |
| 3,451,421 | 6/1969 | Vicenzi et al. | 137/495 |
| 3,645,495 | 2/1972 | Aymar | 251/129.18 |

FOREIGN PATENT DOCUMENTS

| | | | |
|---|---|---|---|
| 750620 | 6/1956 | United Kingdom | 137/505.14 |
| 966346 | 8/1964 | United Kingdom | 137/495 |

*Primary Examiner*—Martin P. Schwadron
*Assistant Examiner*—Stephen M. Hepperle
*Attorney, Agent, or Firm*—Mitchell J. Halista; Trevor B. Joike

[57] ABSTRACT

A fluid pressure regulating valve having a two-stage high and low flow rate control capability combined with a natural-LP gas control pressure changeover uses a spring biased pressure regulating diaphragm controlling a fluid through an orifice defined by a valve seat. A solenoid valve armature is attached to a spring providing the spring bias for the diaphragm and is arranged to be actuated by a selectively energizable solenoid coil. An extension of the armature is captured by a step regulator assembly which is threaded into a valve body containing the regulating diaphragm. The high fire and low fire adjustments in the step regulator assembly are on non-moving threaded members attached to the regulator assembly and bearing on the extension of the armature to vary the energized and deenergized position of the solenoid armature. A positive temperature coefficient material heated by an energizing current for the solenoid operating the valve is located in an energizing circuit of the solenoid coil to provide a change in the energization of the solenoid coil after a threshold temperature of the material is reached. The natural-LP gas pressure changeover utilizes a cam encircling the extension of the armature and a stop means resting on the cam while supporting the end of the armature extension. A screw driver slot is provided for varying the position of the stop member on the cam surface to provide stable natural and LP gas operating positions.

3 Claims, 3 Drawing Figures

4,637,429

FLUID PRESSURE REGULATING VALVE HAVING ADJUSTABLE TWO-STAGE AND NATURAL-LP GAS CHANGEOVER CAPABILITIES

BACKGROUND OF THE INVENTION

1. Field of the Invention

The present invention relates to fluid pressure regulating valves. More specifically, the present invention is directed to a solenoid operated fluid pressure regulating valve.

2. Description of the Prior Art

Pressure regulating valves which are solenoid operated are well-known in the art as shown in U.S. Pat. No. 3,006,362. However, such prior art valves have not included the combined capability for regulating the fluid pressure controlled by the valve while exhibiting a capability for independent adjustments for a high and low fluid flow rate as well as a changeover from handling natural gas to LP gas which requires respective flow and fluid pressure functions. Accordingly, it would be desirable in order to provide a fully adaptable pressure regulating valve which has the aforesaid capabilities in a compact and low cost package.

SUMMARY OF THE INVENTION

An object of the present invention is to provide an improved pressure regulating valve having a two stage flow rate regulating capability as well as natural-LP pressure regulating changeover function.

In accomplishing this and other objects, there has been provided, in accordance with the present invention, a fluid pressure regulating valve comprising of a flow rate control diaphragm, a pressure regulating spring means bearing on said diaphragm, first means for adjusting a high flow rate position of said spring means, second means coaxial with said first means for adjusting a low flow rate position of said spring means and pressure changeover means coaxial with said first and second means for adjusting said spring means between a first and a second regulating pressure.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
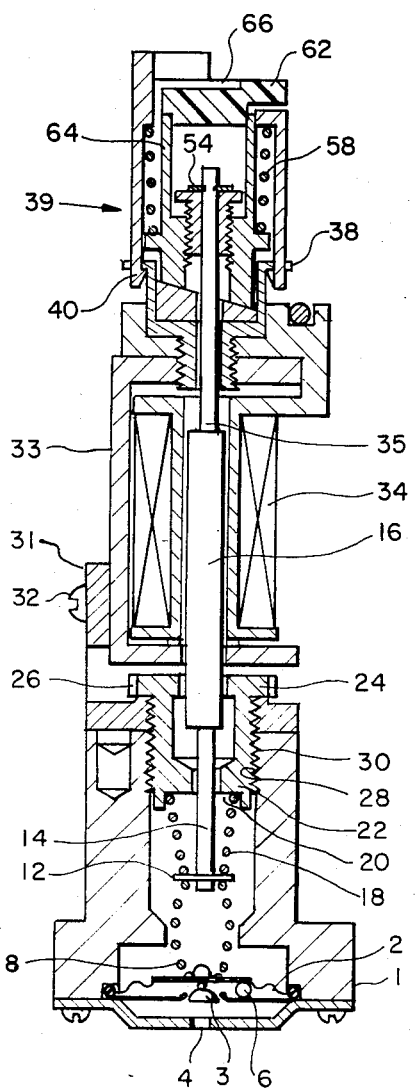
FIG. 1 is a cross-sectional illustration of an example of a fluid pressure regulating valve embodying the present invention.
Figure 2:
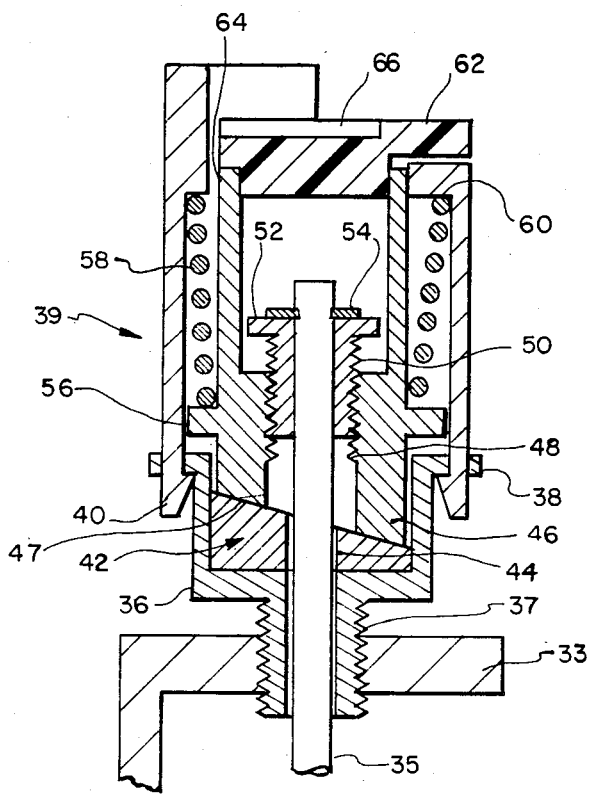
FIG. 2 is an enlarged cross-sectional illustration of a portion of the valve shown in FIG. 1 showing the details of the adjustment elements and FIG. 3 is a circuit diagram of a high and low flow rate energizing circuit for the solenoid of the valve shown in FIG. 1.

Referring to FIG. 1 in more detail, there is shown a fluid pressure regulating valve having valve body 1 containing a pressure regulating diaphragm 2 controlling a flow through an orifice defined by a valve/seat 3 between an input port 4 and an output port 6. The diaphragm is spring biased by a pair of bias springs controlling a reciprocating motion of the diaphragm 2. Specifically, a first bias spring 8 is located between a clip 12 retained in a groove on an end of a first extension 14 of a first end of a solenoid armature 16 and the diaphragm 2. Concurrently, a second spring 18 is located between the end clip 12 and internal recess 20 located in an end of an externally threaded cup 22 and concentric with the extension 14. An outwardly projecting flange 24 on a open end of the cup 22 is provided with peripheral gear teeth 26. A threaded outer surface 28 of the cu 22 is driven into engagement with a threaded opening 30 in an end of the valve body concentric with the extension 14. A tool (not shown) is used to drive the cup 22 into the valve body 1 by means of the gear teeth 26. A cylindrical coaxial extension 31 is captured between the flange 24 and the valve body 1 and is attached by a set screw 32 to one end of a frame 33 housing a solenoid coil 34. The coil 34 is arranged to encircle the armature 16 to provide a means for selectively positioning the armature 16 in response to an energizing signal applied to the coil 34. A second end of the armature 16 is provided with a second extension 35 which is arranged to extend into an adjustment assembly having a flanged cylindrical base 36 with an outwardly projecting hollow cylindrical support 37. The support 37 is coaxial with the second end 35 and is threaded by external threads into the frame 33.

An outwardly projecting peripheral flange 38 on the base 36 is provided with peripheral cutouts to capture a cylindrical cap 39 having a plurality of inwardly projecting ears 40 located on an inner surface of an end of the cap 39. The base 36 contains a cam surface element 42 located on an inside surface of the base 36 and having an axial hole 44 encircling the second armature extension 35. A cylindrical stop element 46 has a tapered first end surface 47 which encircles the second armature extension 35 and rests on the surface of the cam element 42. The stop element 46 has an internally threaded central opening 48 which encircles the second extension 35. A threaded plug 50 is arranged to be supported in the threaded opening in the stop element 46 and is provided with a flat end surface 52 facing a stop clip 54 captured in a groove on an end of the second armature extension 35. An outwardly extending ridge 56 on the stop element 46 is arranged to support one end of a circular bias spring 58. The other end of the bias spring 58 is arranged to bear against an inwardly projecting shoulder 60 on the cap 39. A selectively removable plug 62 is retained in an open second end 64 of the stop element 46 and is provided with a screw driver slot 66 for enabling an adjusting tool to be applied to the stop element 46. The adjustment assembly is supported on a second end of the frame 33 housing the solenoid coil 34. The set screw 32 is used to fix the adjusting assembly in the valve body 1 after a final position of the adjusting assembly on the valve body 1 has been attained by means of the gear teeth 26 turning the cup 22 into the valve body 1.

In operation, the screwdriver slot 66 is used to provide a changeover capability from natural to LP gas, e.g., propane, by rotating the stop element 46 with respect to the cam element 42 to provide a pair of stable operating positions for the end of the second armature extension 35. Since propane is delivered with a higher pressure than natural gas, propane requires that bias springs 8, 18 exert a greater force on the diaphragm 2 than that required for natural gas. By rotating the tapered surface 47 resting cam element 42 by means of a tool inserted in the slot 66, the rest position of the armature 16 is shifted on the cam 42 to vary the spring bias on the diaphragm 2. Thus, the solenoid armature 16 is moved between a first and a second position which affects the bias springs 8, 18 and 58 and, consequently, the pressure exerted on the regulating diaphragm 2. The base 36, on the other hand, is used to provide a low fire adjustment by enabling a movement of the base 36 longitudinally with respect to the armature extension 35 on the threaded interconnection between the adjustment assembly support 36 and the frame 33. A high fire adjustment capability is provided by the threaded plug 50 which has an end 52 bearing on the end of the second armature extension 35 through the stop clip 54. The plug 50 is reached for adjustment by removing the plug 62 containing the screwdriver slot 66. The rotational adjustment of the plug 50 provides a limited longitudinal travel of the extension 35 by moving the spacing of the clip 54 on the end of the extension 35 and the stop element 46 to also affect the spring bias. Thus, the threaded plug 50 provides an adjustment of the downward travel of the armature 16 while the threaded base 36 provides an adjustment of the upward travel of the armature 16. In this arrangement, it should be noted that the spring bias adjustments are performed on non-moving elements of the adjustment assembly.

Figure 3:
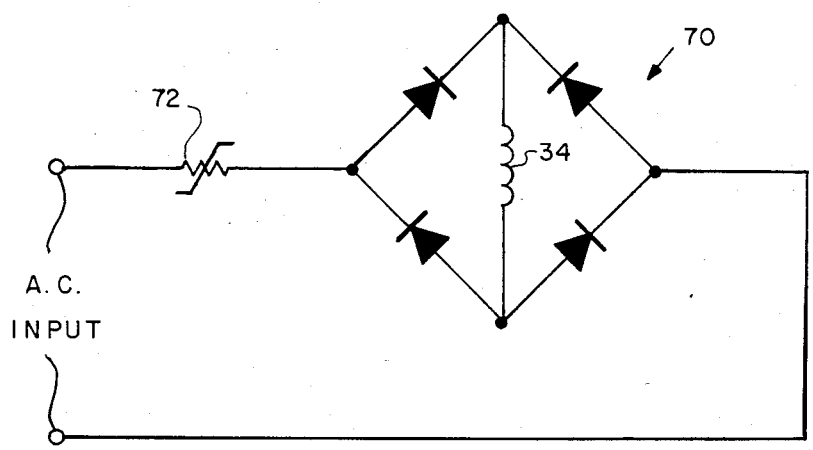

In FIG. 3, there is shown a circuit for providing a step change in the energizing current supplied from an A.C. source to the solenoid coil 34. The solenoid coil 34 is connected across a first diagonal of a diode bridge 70. A second diagonal of the bridge 70 is connected across an A.C. source (not shown) through a resistor 72 of a positive temperature coefficient (PTC) material, such materials being well-known in the art to provide a step resistance change when the threshold or switching temperature of the resistor 72 is reached. Thus, the solenoid 34 is initially energized to pull the armature 16 to a first, or up, position which is used for a "low fire" position. The current through the PTC resistor 72 heats it to the switching temperature, e.g., 320° F. At the switching temperature, the resistor 72 produces a step increase in its resistance which decreases the coil current to allow the armature 16 to drop to its second, or down, position which is used for a high-fire position.

Accordingly, it may be seen that there has been provided, in accordance with the present invention, an improved two-stage flow regulating capability as well as a natural gas to LP changeover function.

The embodiments of the present invention in which an exclusive property or privilege is claimed are defined as follows:

1. A fluid pressure regulating valve comprising
a flow rate control diaphragm means,
a pressure regulating spring means bearing on said diaphragm means,
first means for adjusting a high flow rate position of said spring means,
second means coaxial with said first means for adjusting a low flow rate position of said spring means and
pressure changeover means coaxial with said first and second means for adjusting said spring means between a first and a second regulating pressure diaphragm actuating means including an armature having a first end operatively associated with said first means, said second means and said changeover means and a second end operatively associated with said pressure regulating spring means, a selectively energizable solenoid coil, a hollow valve body enclosing said diaphragm and a valve orifice and said selectively energizable solenoid coil arranged to urge said armature to a first position in opposition to said spring means, an adjusting assembly means mounted on a wall of said valve body for coaxially supporting said first means, said second means and said changeover means and said first end of said armature and a stop means captured on said first end of said armature to limit the movement of said first means, said second means and said changeover means.

2. A valve as set forth in claim 1 wherein said diaphragm means includes a control diaphragm, said valve orifice facing said diaphragm and wherein said spring means biases said diaphragm toward said orifice.

3. A valve as set forth in claim 1 wherein said changeover means includes a cam means coaxial with said first end of said armature.

* * * * *